United States Patent
Kim et al.

(10) Patent No.: US 7,471,283 B2
(45) Date of Patent: Dec. 30, 2008

(54) MOBILE COMMUNICATION DEVICE CAPABLE OF PROVIDING CANDIDATE PHONE NUMBER LIST AND METHOD OF CONTROLLING OPERATION OF THE MOBILE COMMUNICATION DEVICE

(75) Inventors: Tae Hun Kim, Inchun-si (KR); Jin Sang Park, Seoul (KR)

(73) Assignee: LG Electronics Inc., Seoul (KR)

( * ) Notice: Subject to any disclaimer, the term of this patent is extended or adjusted under 35 U.S.C. 154(b) by 21 days.

(21) Appl. No.: 11/761,888

(22) Filed: Jun. 12, 2007

(65) Prior Publication Data
US 2008/0186283 A1 Aug. 7, 2008

(30) Foreign Application Priority Data
Feb. 3, 2007 (KR) .................... 10-2007-0011291

(51) Int. Cl.
*G09G 5/00* (2006.01)
(52) U.S. Cl. .............. 345/173; 345/156; 345/168; 345/169; 345/179; 455/566; 715/773; 715/840; 715/851; 715/864
(58) Field of Classification Search ............ 345/156, 345/168, 169, 173, 179
See application file for complete search history.

(56) References Cited

U.S. PATENT DOCUMENTS

| | | | |
|---|---|---|---|
| 6,593,949 B1 * | 7/2003 | Chew et al. | 715/841 |
| 6,950,988 B1 * | 9/2005 | Hawkins et al. | 715/700 |
| 2008/0167081 A1 * | 7/2008 | Eng | 455/566 |

FOREIGN PATENT DOCUMENTS

KR 10-2007-0113005 11/2007

* cited by examiner

*Primary Examiner*—Richard Hjerpe
*Assistant Examiner*—Jennifer T Nguyen
(74) *Attorney, Agent, or Firm*—Lee Hong Degerman Kang & Waimey

(57) ABSTRACT

A mobile communication device capable of providing a candidate phone number list and a method of controlling an operation of the mobile communication device is provided. The method includes displaying a phone number input window and a display window on the touch screen, displaying a string of numbers input to the phone number input window in the display window and displaying a candidate phone number list on the touch screen if a touch input to the display window is detected when the input number string is displayed in the display window, the candidate phone number list including a plurality of phone numbers that contain the input number string.

34 Claims, 11 Drawing Sheets

MOBILE COMMUNICATION DEVICE CAPABLE OF PROVIDING CANDIDATE PHONE NUMBER LIST AND METHOD OF CONTROLLING OPERATION OF THE MOBILE COMMUNICATION DEVICE

CROSS-REFERENCE TO RELATED APPLICATION

Pursuant to 35 U.S.C. § 119(a), this application claims the benefit of earlier filing date and right of priority to Korean Application No. 10-2007-0011291, filed Feb. 3, 2007, the contents of which is incorporated by reference herein in its entirety.

FIELD OF THE INVENTION

The present invention relates to a mobile communication device that is capable of providing a candidate phone number list during the input of a phone number in response to touch input to a touch screen and a method of controlling an operation of the mobile communication device.

DESCRIPTION OF THE RELATED ART

Mobile communication devices, such as mobile phones or personal digital assistants (PDAs), generally provide various additional functions, such as voice call and Short Message Service (SMS) functions, in addition to basic functions. Various new technologies have been widely applied to such mobile communication devices.

Recently, public attention has been increasingly drawn to applications that use Phase change Random Access Memory (PRAM) chips as core chips and the application of ultra high pixel Complementary Metal-Oxide Semiconductor (CMOS) chips as camera modules. Future trends in the design of mobile communication devices are expected to include mobile communication devices equipped with full touch screens and double-sided liquid crystal displays (LCD) that can display independent images on each side.

Double-sided LCDs and full touch screens have received more and more public attention. This is because double-sided LCDs can help reduce the size of mobile communication devices while enabling a variety of designs and full touch screens can make keypads, one of the basic elements of conventional mobile communication devices, unnecessary.

However, given that the design of mobile communication devices must ensure both portability and mobility, there is a clear limit in allocating space to devices such as display devices or input devices. Therefore, the size of full touch screens that may be used in mobile communication devices is limited. In order for a mobile communication device to perform both input and output functions at the same time using a full touch screen without a keypad, it is necessary to develop efficient methods of controlling operation of a mobile communication device.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the present invention, a method of controlling an operation of a mobile communication device equipped with a touch screen is provided. The method includes displaying a first area and a second area on the touch screen, the first area for entering a string of at least one number and the second area for displaying the string of at least one number and displaying a list on the touch screen if a touch input is applied to the second area, the list including information related to at least one phone number stored in a memory, wherein the list includes information related to phone numbers that contain the string of at least one number if at least one phone number stored in the memory matches the string of at least one number displayed in the second area.

It is contemplated that the list is displayed on the first area of the touch screen. It is further contemplated that displaying the list includes replacing the first area of the touch screen.

It is contemplated that the method further includes replacing the list with the previously displayed first area if a touch input to the display window is detected on the second area when the list is displayed. It is further contemplated that the method further includes displaying a communication menu if a touch input is detected in an area of the list where information related to a specific phone number is displayed.

It is contemplated that the communication menu includes at least a first area, a second area and a third area and further including placing a call to the specific phone number if a touch input is detected in the first area, performing a function for sending a text message to the specific phone number if a touch input is detected in the second area and displaying the previously displayed list if a touch input is detected in the third area. It is further contemplated that the first area includes at least one of a touch keypad, a handwriting recognition input window, a continuous handwriting recognition input window and a QWERTY input window.

It is contemplated that the method further includes automatically placing a call to a specific phone number user if a touch input is detected in an area of the list where information related to the specific phone number is displayed. It is further contemplated that the method further includes displaying a total number of stored phone numbers that contain the string of at least one number.

It is contemplated that the method further includes adjusting the displayed list and the displayed total number if the string of at least one number is altered by one of adding or deleting numbers displayed in the second area. It is further contemplated that the method further includes displaying the list on the touch screen if a touch input is detected on a soft key.

It is contemplated that the information related to the at least one phone number includes at least one of a name and the phone number. It is further contemplated that the method further includes displaying at least one operation menu area on the touch screen, each of the at least one operation menu area having a corresponding operation and performing the corresponding operation if a touch input is detected in the at least one operation menu area.

It is contemplated that performing the corresponding operation includes storing the string of at least one number input in the first area in the memory. It is further contemplated that the list includes information related to one of most recently dialed/received phone numbers and most frequently dialed/received phone numbers if no string of at least one number is displayed in the second area when the touch input is applied to the second area. Preferably, the list includes information related to one of most recently dialed/received phone numbers and most frequently dialed/received phone numbers if no phone number stored in the memory matches the string of at least one number displayed in the second area when the touch input is applied to the second area.

In another aspect of the present invention, a mobile communication device is provided. The mobile communication device includes a touch screen, a memory configured to store phone numbers and a controller configured to display a first area on the touch screen including a touch pad for entering a string of at least one number, display a second area on the touch screen for displaying the string of at least one number, and display a list on the touch screen including information related to at least one phone number stored in the memory if a touch input is applied to the second area, wherein the list includes information related to phone numbers that contain the string of at least one number if at least one phone number stored in the memory matches the string of at least one number displayed in the second area.

It is contemplated that the controller is further configured to display the list on the first area of the touch screen. It is further contemplated that the controller is further configured to replace the first area with the list.

It is contemplated that the controller is further configured to replace the list with the previously displayed first area if a touch input to the display window is detected on the second display area when the list is displayed. It is further contemplated that the controller is further configured to display a communication menu if a touch input is detected in an area of the list where information related to a specific phone number is displayed.

It is contemplated that the communication menu includes at least a first area, a second area and a third area and the controller is further configured to place a call to the specific phone number if a touch input is detected in the first area, perform a function for sending a text message to the specific phone number if a touch input is detected in the second area and display the previously displayed list if a touch input is detected in the third area. It is further contemplated that the first area includes at least one of a touch keypad, a handwriting recognition input window, a continuous handwriting recognition input window and a QWERTY input window.

It is contemplated that the controller is further configured to automatically place a call to a specific phone number if a touch input is detected in an area of the list where information related to the specific phone number is displayed. It is further contemplated that the controller is further configured to display a total number of stored phone numbers that contain the string of at least one number.

It is contemplated that the controller is further configured to adjust the displayed list and the displayed total number if the string of at least one number is altered by one of adding or deleting numbers displayed in the second area. It is further contemplated that the controller is further configured to display the list on the touch screen if a touch input is detected on a soft key when the string of at least one number is displayed.

It is contemplated that the information related to the at least one phone number includes at least one of a name and the phone number. It is further contemplated that the controller is further configured to display at least one operation menu area on the touch screen, each of the at least one operation menu area having a corresponding operation and perform the corresponding operation if a touch input is detected in the at least one operation menu area.

It is further contemplated that the corresponding operation includes storing the string of at least one number input in the first area in the memory. It is further contemplated that the controller is further configured to display a list including information related to one of most recently dialed/received phone numbers and most frequently dialed/received phone numbers if no string of at least one number is displayed in the second area when the touch input is applied to the second area. Preferably, the controller is further configured to display a list including information related to one of most recently dialed/received phone numbers and most frequently dialed/received phone numbers if no phone number stored in the memory matches the string of at least one number is displayed in the second area when the touch input is applied to the second area.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
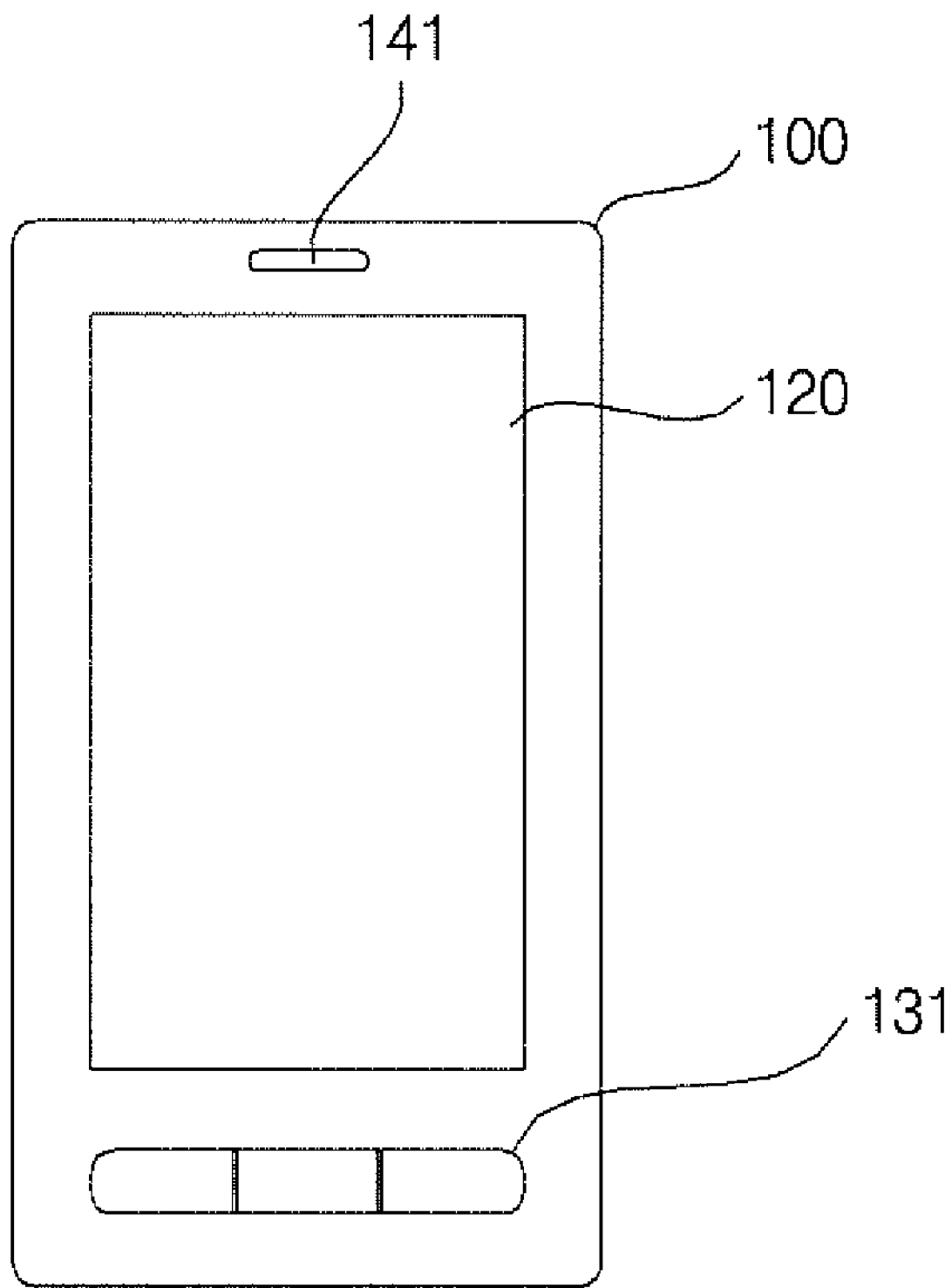
FIGS. 1 and 2 are diagrams of the exterior of a mobile communication device according to an embodiment of the present invention.
Figure 2:
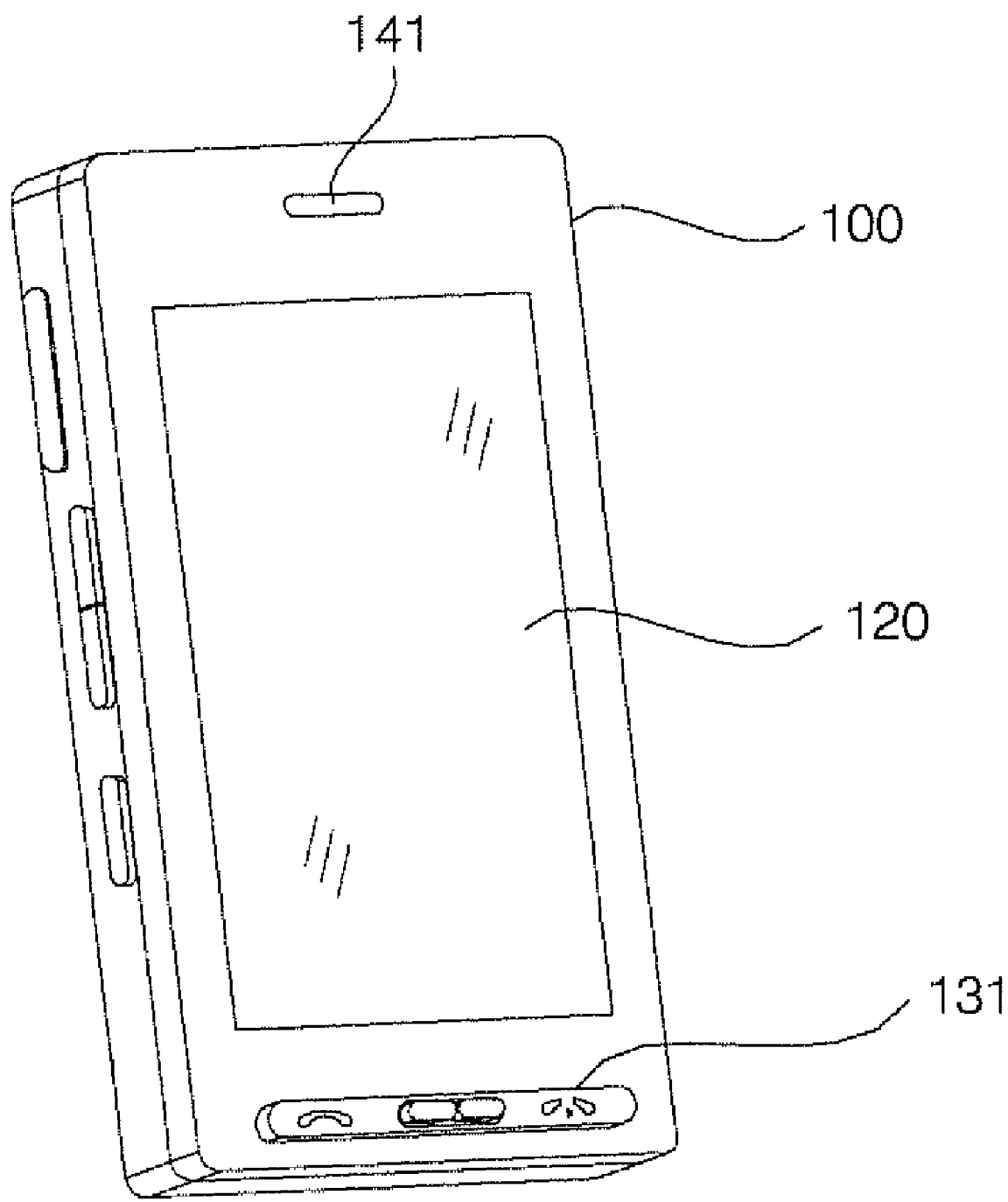

The present invention will be described with reference to the accompanying drawings, in which exemplary embodiments of the invention are shown. FIGS. 1 and 2 illustrate the exterior of a mobile communication device 100 according to an embodiment of the present invention.

As illustrated in FIGS. 1 and 2, the mobile communication device 100 includes a receiver 141 located on a front surface of the mobile communication device 100 that outputs a voice signal of another party during a phone conversation, a touch screen 120 that can be used as both an input device and a display device, and manipulation keys 131 used to receive or terminate a call. Manipulation keys (not shown) for increasing or reducing volume or performing camera functions may also be disposed on one side of the mobile communication device 100.

The touch screen 120 is a display device that responds to a touch input from a user. Specifically, the touch screen 120 allows the user to interact with the mobile communication device 100 by touching pictures or characters displayed on the touch screen with a finger.

Figure 3:
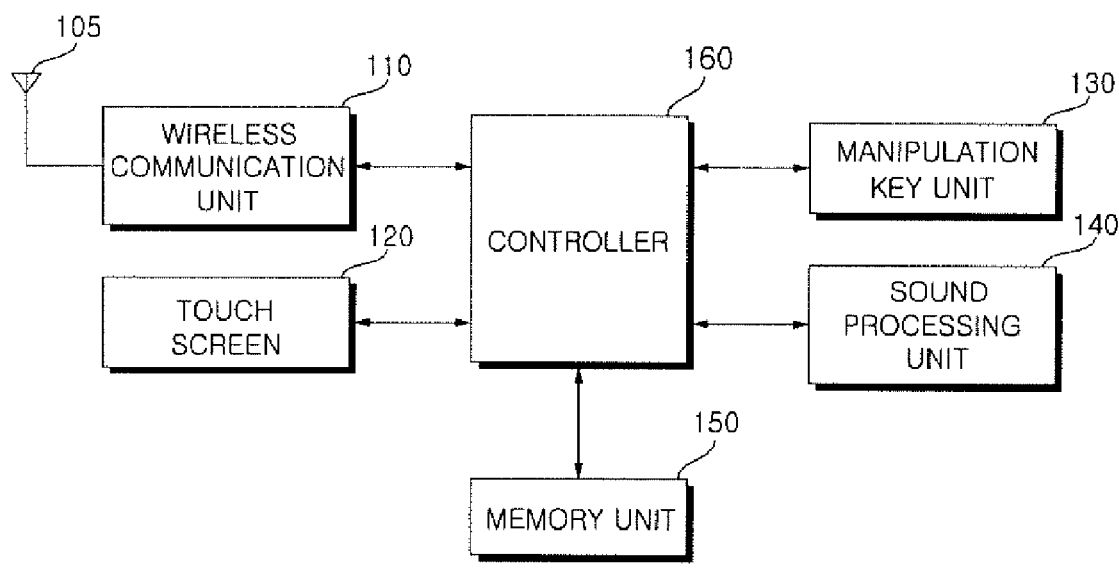
FIG. 3 is a block diagram of a mobile communication device according to an embodiment of the present invention.

FIG. 3 is a block diagram of the mobile communication device 100 according to an embodiment of the present invention. As illustrated in FIG. 3, the mobile communication device 100 includes a wireless communication unit 110, a touch screen 120, a manipulation key unit 130, a sound processing unit 140, a memory unit 150, and a controller 160.

The wireless communication unit 110 provides an interface for wireless communication with a base station through an antenna 105. The wireless communication unit 110 includes a duplex filter for filtering a signal received through the antenna 105, a power amplifier for amplifying a transmit signal, a frequency up-converter circuit in a transmission path and a frequency down-converter circuit in a reception path.

The touch screen 120 may function as an input device for receiving user commands and data. The touch screen 120 may also function as a display device for displaying menus used for operating the mobile communication device 100 and other information, such as a state of a received call or battery information.

The touch screen 120 may include a touch screen panel and a touch screen panel controller. The touch screen panel, which is a transparent panel attached to the exterior of the mobile communication device 100, may be connected to buses in the mobile communication device. The touch screen panel determines whether the touch screen 120 has been touched.

The touch screen panel may transmit a signal corresponding to a detected touch input on the touch screen 120 to the touch screen panel controller. The touch screen panel controller processes the signal transmitted by the touch screen panel and transmits data obtained through processing to the controller 160. In this way, the controller 160 can determine whether there has been a touch input on the touch screen 120 and which portion of the touch screen 120 has been touched according to the data transmitted by the touch screen panel controller.

The manipulation key unit 130 may include keys for making, receiving or terminating a call. The manipulation key unit 130 may also receive and process a user command by transmitting a signal to the controller 160 corresponding to a key that is touched by the user. The sound processing unit 140 may amplify a sound signal output by the controller 160 and output the amplified signal to a speaker. The sound processing unit 140 may also convert a sound signal received via a microphone, such as the receiver 141, into an electrical signal and transmit the electrical signal to the controller 160.

The memory unit 150 stores programs and data that are necessary for the operation of the mobile communication device 100 and various data that the user wishes to store. The memory unit 150 may also store a software driver for controlling the touch screen 120.

The controller 160 controls the operation of the mobile communication device 100 by controlling the wireless communication unit 110, the touch screen 120, the manipulation key unit 130, the sound processing unit 140, and the memory unit 150. Specifically, when a dialing menu is selected by a user, the controller 160 may display on the touch screen 120 a phone number input window and a display window for displaying a string of numbers input by the user using the phone number input window.

When a touch input is detected on the display window of the touch screen 120, the controller 160 may display a candidate phone number list on the touch screen 120, the candidate phone number list including a plurality of previously-stored phone numbers that contain the number string displayed in the display window. If a touch input is detected on the display window when no number string has been input to the phone number input window, the controller 160 may display a list of most recently dialed/received numbers or a list of most frequently dialed/received numbers on the touch screen 120. The controller 160 may also display a candidate phone number list on the touch screen 120 when a touch input to a soft key is detected.

Figure 4A:
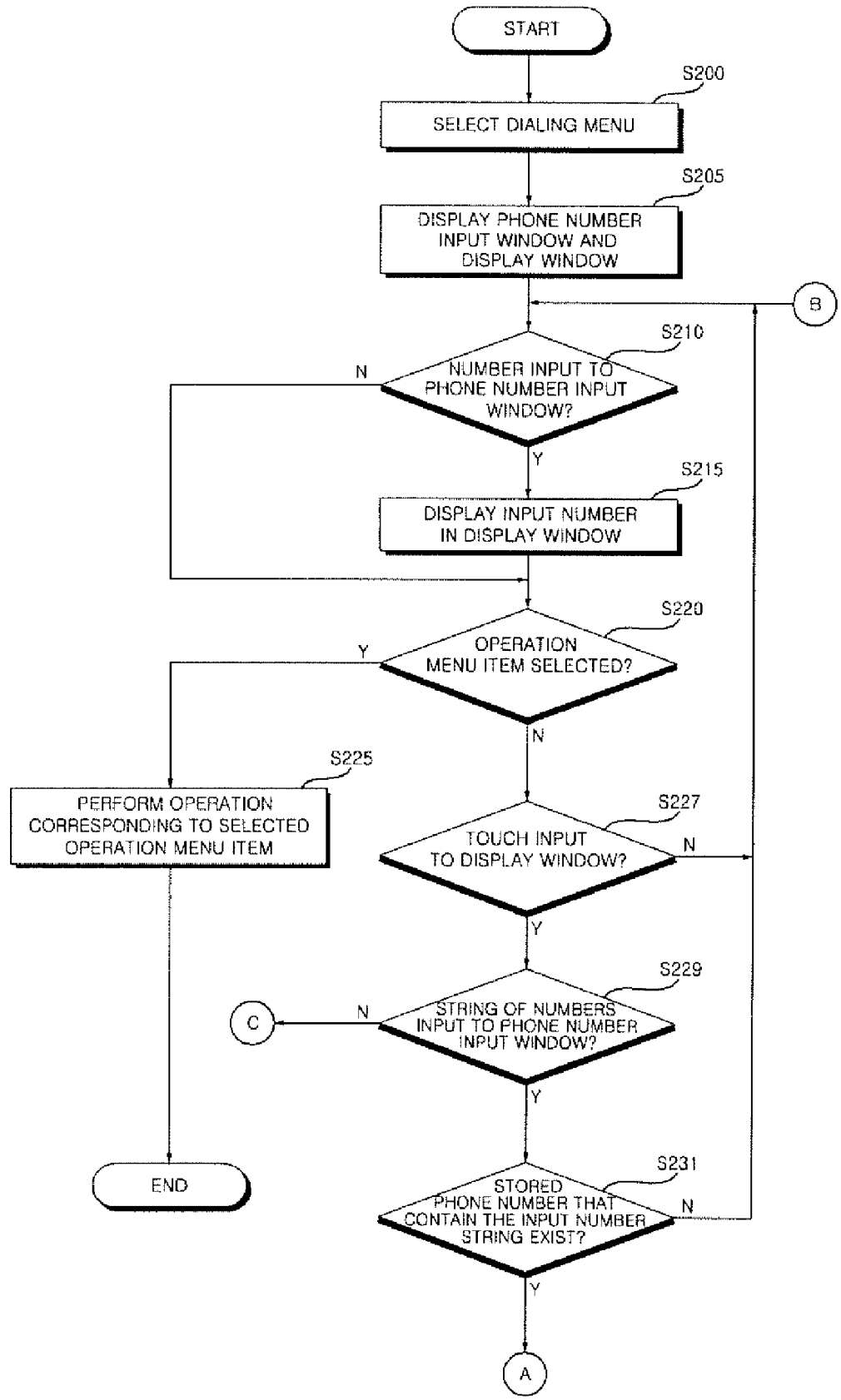
FIGS. 4A 4C are flowcharts illustrating a method of controlling an operation of a mobile communication device according to an embodiment of the present invention.
Figure 4B:
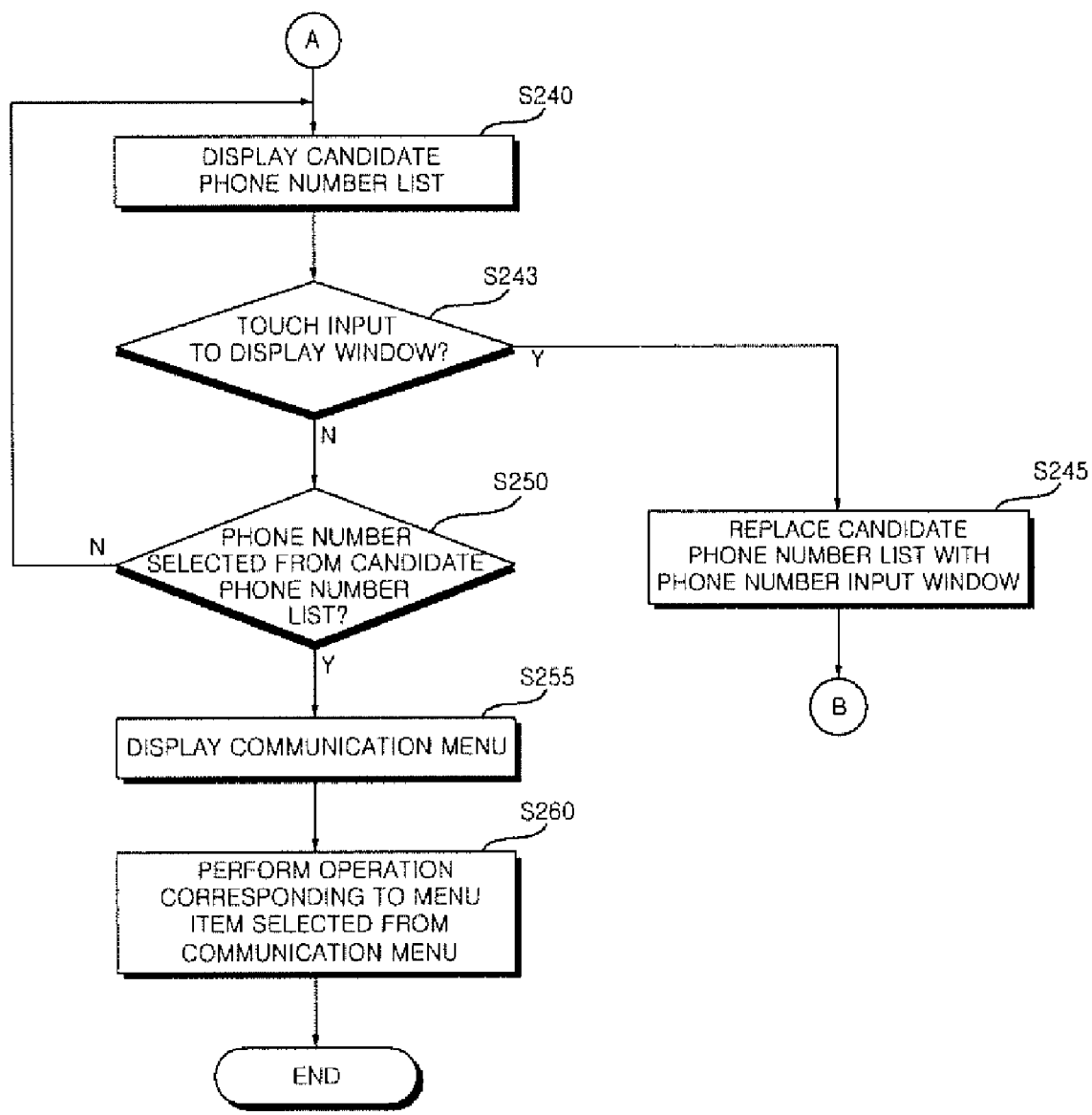
Figure 4C:
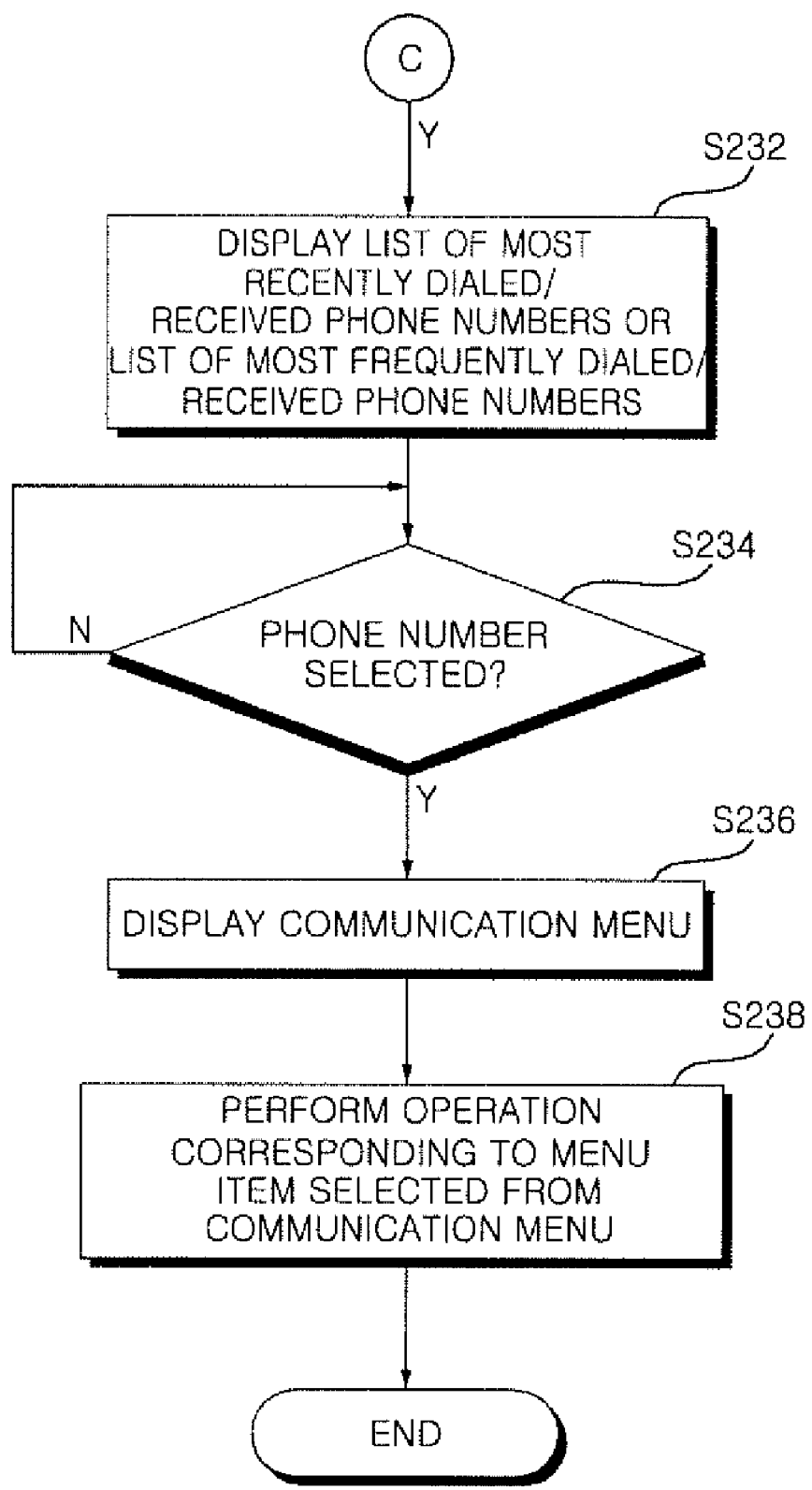

FIGS. 4A and 4B are flowcharts illustrating a method of controlling an operation of a mobile communication device 100 according to an embodiment of the present invention. As illustrated in FIG. 4A, a user selects a dialing menu for making or receiving a call or transmitting messages (S210). The controller 160 then displays a phone number input window and a display window for displaying a string of numbers input to the phone number input window by the user (S205).

The controller 160 determines whether a number has been input to the phone number input window (S210). If it is determined that a number has been input to the phone number input window, the controller 160 displays the number in the display window (S215). It is then determined whether an operation menu item displayed on the touch screen 120 has been touched and selected by the user (S220).

If it is determined that an operation menu item displayed on the touch screen 120 has been selected by the user, the controller 160 performs an operation corresponding to the selected operation menu item (S225). For example, a phone number may be stored or a call made or received.

If it is determined that no operation menu item has been selected by the user, the controller 160 determines whether there has been a touch input to the display window or to a soft key (S227). If it is determined that there has been a touch input to the display window or to a soft key, the controller 160 determines whether a string of numbers has been input to a phone number input window (S229).

If it is determined that no number string has been input to the phone number input window, the controller 160 displays a list of most recently dialed/received phone numbers or a list of most frequently dialed/received phone numbers (232) and determines whether one of the phone numbers included in the candidate phone number list has been selected (S234). If it is determined that one of the phone numbers included in the candidate phone number list has been selected, the controller 160 displays a communication menu for the selected phone number (S236) and performs an operation corresponding to a menu item selected from the communication menu (S238).

If it is determined that a string of numbers has been input to the phone number input window, the controller 160 displays a candidate phone number list including a plurality of stored phone numbers that contain the input number string (S240). The candidate phone number list may be displayed in the area where the phone number input window is displayed, with the phone number input window no longer displayed. If no stored phone numbers contain the input number string, the controller 160 may display a list of most recently dialed/received phone numbers or a list of most frequently dialed/received phone numbers (232).

The controller 160 then determines whether there has been another touch input to the display window (S243). If it is determined that there has been no further touch input to the display window, the controller 160 replaces the candidate phone number list with the phone number input window again (S295). The display of a candidate phone number list or a phone number input window may be performed repeatedly according to touch inputs to the touch screen 120.

If it is determined that there is another touch input to the display window in step S243, the controller 160 determines whether one of the phone numbers included in the candidate phone number list has been selected (S250). If it is determined that one of the phone numbers included in the candidate phone number list has been selected, the controller 160 displays a communication menu for the selected phone number (S255) and performs an operation corresponding to a menu item selected from the communication menu (S260).

Figure 5:
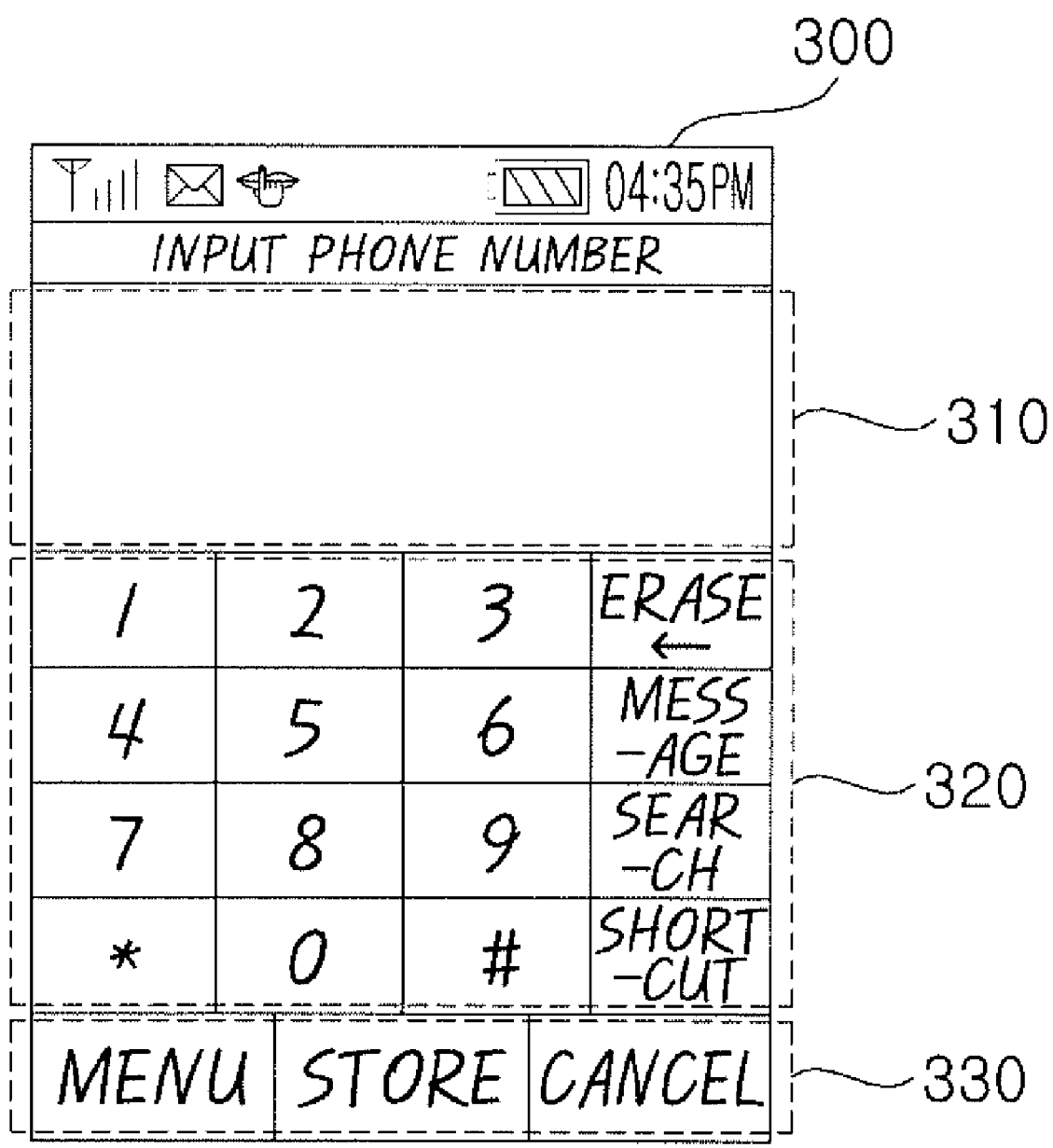
FIGS. 5 through 7 illustrate touch screen images for explaining the method illustrated in FIGS. 4A and 4B.

According to the present invention, it is possible to display a candidate phone number list according to a touch input to a display window during the input of a phone number to a phone number input window displayed on the touch screen 120. FIGS. 5 through 7 illustrate touch screen images for explaining the method illustrated in FIGS. 4A and 4B.

As illustrated in FIG. 5, a touch screen image 300 displayed on a touch screen 120 includes a phone number input window 320 with a keypad and a display window 310 that displays one or more numbers input to the phone number input window. Operation control menu items 330, such as 'MENU', 'STORE', and 'CANCEL', are displayed below the phone number input window 320. The phone number input window 320 may be an input window other than a keypad input window, such as a handwriting recognition input window, a continuous handwriting recognition window, or a QWERTY input window.

Figure 6A:
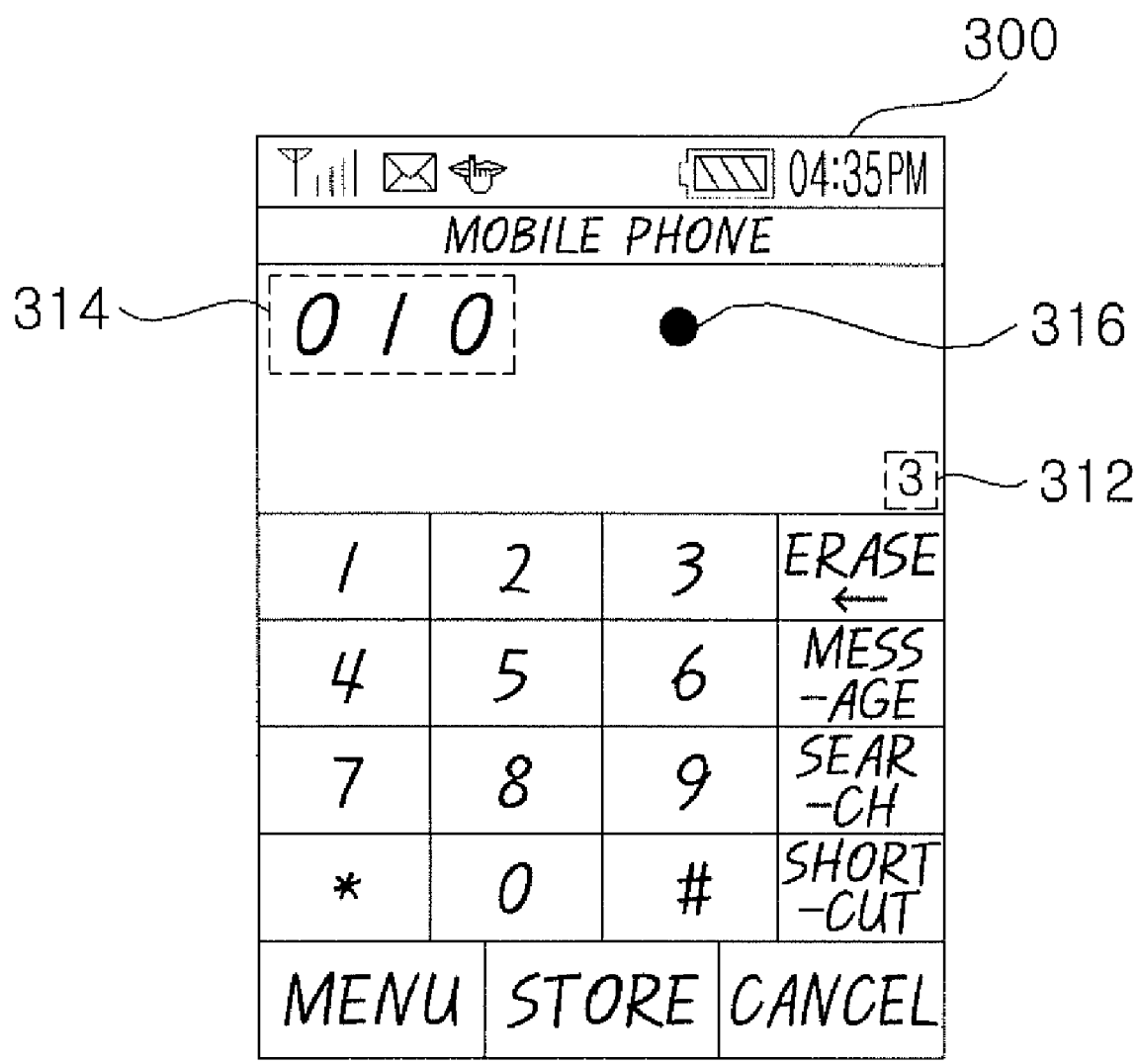

A string of numbers input to the phone number input window 320 is displayed in the display window 310, as indicated by reference numeral 314 of FIG. 6A. The total number of candidate phone numbers containing the input number string is then displayed in the display window 320, as indicated by reference numeral 312 of FIG. 6A.

Figure 6B:
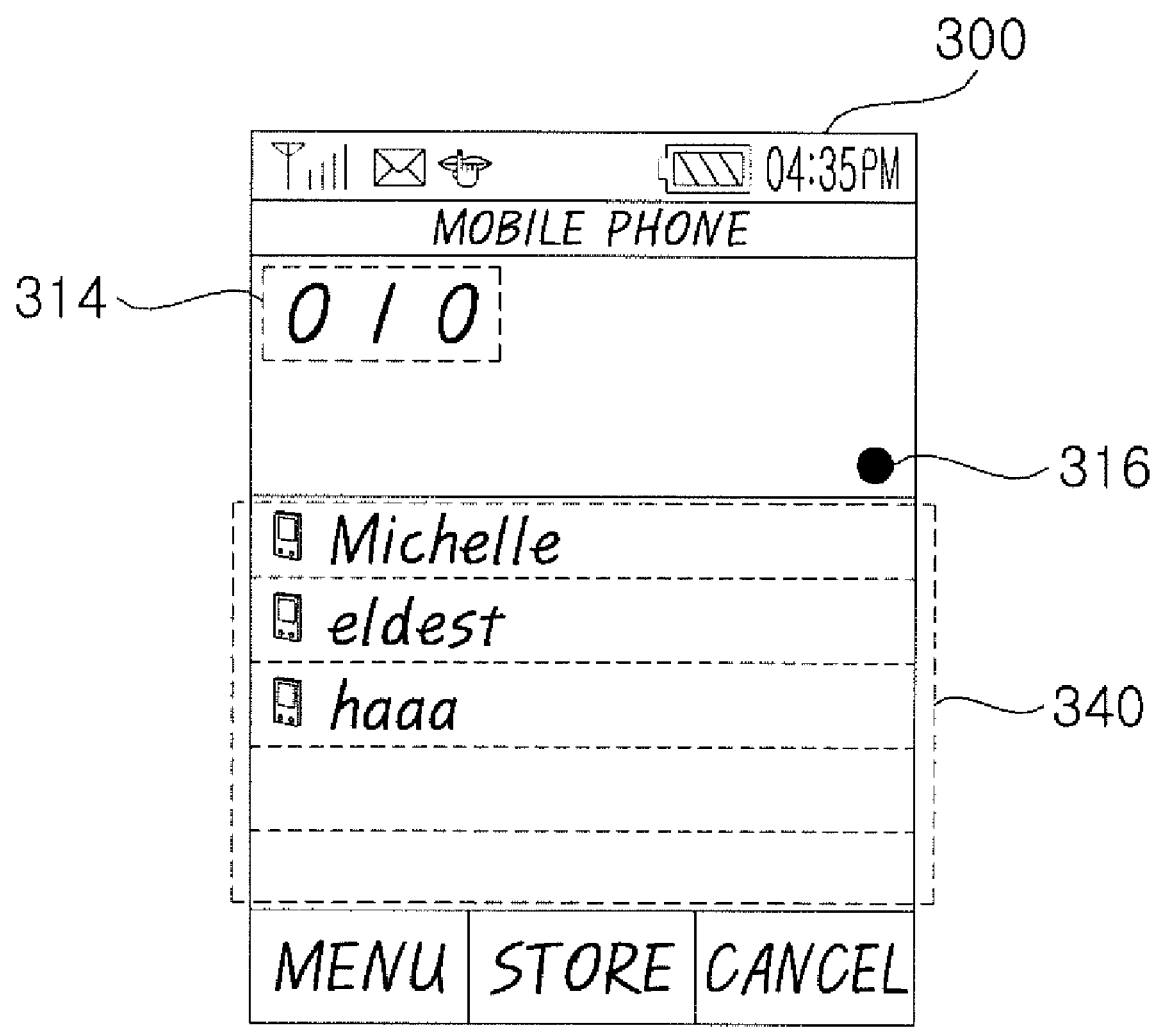

When a touch input to the display window 320 is detected, as indicated by reference numeral 316 of FIG. 6A, a candidate phone number list 340 is displayed in the area where the phone number input window 320 was displayed and the phone number input window is no longer displayed, as illustrated in FIG. 6B. If another touch input to the display window 320 is detected while the candidate phone number list 340 is displayed, as indicated by reference numeral 316 of FIG. 6B, the candidate phone number list 340 is replaced by the phone number input window 320.

Figure 7A:
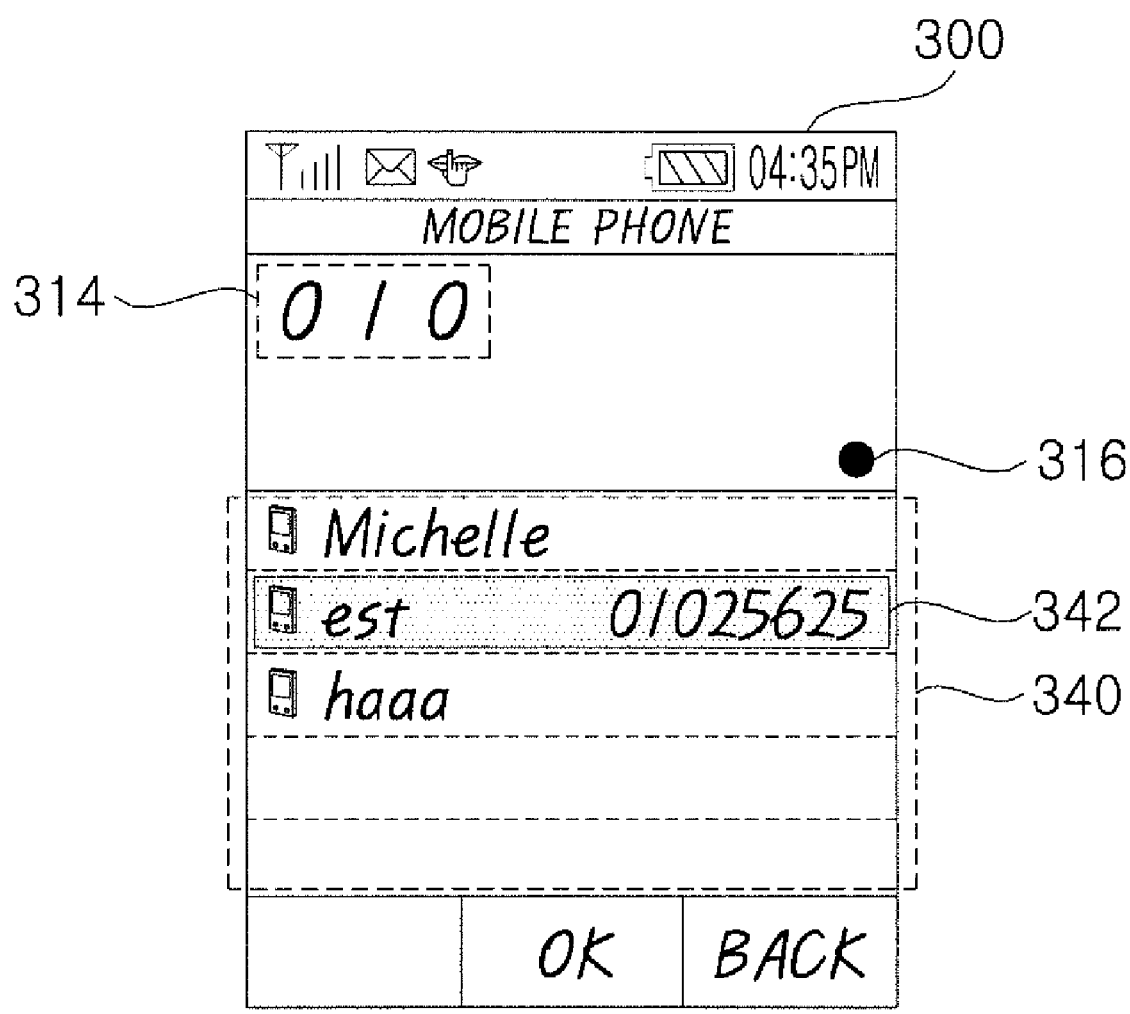
Figure 7B:

FIGS. 7A and 7B illustrate a touch screen image 300 generated when one of the phone numbers included in the candidate phone list 340, such as a phone number item 342 in FIG. 7A, is selected. As illustrated in FIG. 7B, when the phone number item 342 is selected, a communication menu corresponding to the phone number is displayed at the bottom of the touch screen image 300.

If a menu item, such as 'MESSAGE' 372, is selected from the communication menu, a message may be sent to a phone number corresponding to the phone number item 342. If a menu item, such as 'CALL' 374, is selected, a voice call may be made to the phone number corresponding to the phone number item 342. If a menu item, such as 'CANCEL' 376, is selected, the touch screen may return to a previous touch screen image.

The present invention can be realized as computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network such that computer-readable code is written thereto and executed therefrom in a decentralized manner. Functional programs, code, and code segments needed for realizing the present invention can be easily construed by one of ordinary skill in the art.

According to the present invention, a phone number input window and a display window for displaying one or more numbers input to the phone number input window are displayed on a touch screen. When a touch input to the display window is detected after a string of numbers is input to the phone number input window, a candidate phone number list including phone numbers that contain the input number string is provided to a user.

It is also possible for a user to quickly communicate with a desired other user with reference to a candidate phone number list. It is also possible for a user to efficiently control a mobile communication device equipped with even a small-sized touch screen.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the meters and bounds of the claims, or equivalence of such meters and bounds, are embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of controlling a mobile communication terminal having a touch screen, the method comprising:
    displaying a first area and a second area on the touch screen, the first area provided to input a digit string with at least one number on the touch screen, the second area provided to display the digit string;
    displaying a list comprising information corresponding to a phone number including the digit string on the touch screen when a digit string entered on the second area through the touch screen matches at least one phone number stored in the mobile communication terminal; and
    replacing the list with the first area when a touch input is received on the second area while the list is displayed,
    wherein the list is displayed on the first area and the first area is replaced with the list.

2. The method of claim 1, wherein the first area comprises a touch key pad, a writing recognition input window, a continuous-writing input window or a qwerty input window.

3. The method of claim 1, further comprising automatically performing a call to a specific phone number when a touch input is received on an area on which information related to the specific phone number in the list is displayed.

4. The method of claim 1, further comprising displaying the number of phone numbers including the digit string that are stored in the mobile communication terminal.

5. The method of claim 4, further comprising adjusting the displayed number of the phone numbers and adjusting the list when the digit string displayed on the second area is altered by adding or deleting a phone number.

6. The method of claim 1, further comprising displaying the list on the touch screen when a touch input is received via a soft key.

7. The method of claim 1, wherein the information corresponding to the phone number comprises at least a name or a phone number.

8. The method of claim 1, further comprising:
displaying at least one operation menu area on the touch screen, each of the at least one operation menu area having a corresponding operation; and
performing the corresponding operation if a touch input is received in the at least one operation menu area.

9. The method of claim 8, wherein performing the corresponding operation comprises storing the digit string entered at the first area in a memory.

10. The method of claim 1, further comprising displaying a list comprising information corresponding to at least a most-frequent phone number or a recent phone number on the touch screen if the digit string is not displayed on the second area when a touch input is received on the second area.

11. The method of claim 10, further comprising displaying a communication menu when a touch input is received on the area of the list on which information corresponding to a specific phone number is displayed.

12. The method of claim 11, wherein
the communication menu comprises at least a first area, a second area, or a third area,
a call is made to the specific phone number when a touch input is received on the first area,
a function for sending a text message is performed when a touch input is received on the second area, and
a previous list is displayed when a touch input is received on the third area.

13. The method of claim 1, further comprising displaying a list comprising information corresponding to at least a most-frequent phone number or a recent phone number on the touch screen if the digit string displayed on the second area does not match at least one phone number stored in the mobile communication terminal when a touch input is received on the second area.

14. The method of claim 13, further comprising displaying a communication menu when a touch input is received on the area of the list on which information corresponding to a specific phone number is displayed.

15. The method of claim 14, wherein
the communication menu comprises at least a first area, a second area, or a third area,
a call is made to the specific phone number when a touch input is received on the first area,
a function for sending a text message is performed when a touch input is received on the second area, and
a previous list is displayed when a touch input is received on the third area.

16. The method of claim 1.

17. The method of claim 16, wherein
the communication menu comprises at least a first area, a second area, or a third area,
a call is made to the specific phone number when a touch input is received on the first area,
a function for sending a text message is performed when a touch input is received on the second area, and
a previous list is displayed when a touch input is received on the third area.

18. A mobile communication terminal, comprising:
a touch screen;
a memory storing a phone number; and
a controller displaying a first area and a second area on the touch screen, the first area provided to input a digit string with at least one number and the second area provided to display the digit string, and displaying a list comprising information corresponding to a phone number including the digit string on the touch screen when a digit string entered on the second area through the touch screen matches at least one phone number stored in the memory,
wherein the controller displays the list on the first area, replaces the first area with the list, and replaces the list with the first area when an input is received on the second area through the touch screen while the list is displayed.

19. The mobile communication terminal of claim 18, wherein the first area comprises a touch key pad, a writing recognition input window, a continuous-writing input window, or a qwerty input window.

20. The mobile communication terminal of claim 18, wherein the controller automatically performs a call to a specific phone number when a touch input is received on an area on which information related to the specific phone number in the list is displayed.

21. The mobile communication terminal of claim 18, wherein the controller displays the number of phone numbers including the digit string that are stored in the mobile communication terminal.

22. The mobile communication terminal of claim 21, wherein the controller adjusts the displayed number and adjusts the list when the digit string displayed on the second area is altered by adding or deleting a phone number.

23. The mobile communication terminal of claim 18, wherein the controller displays the list on the touch screen when a touch input is received via a soft key.

24. The mobile communication terminal of claim of claim 18, wherein the information corresponding to the phone number includes at least a name or a phone number.

25. The mobile communication terminal of claim 18, wherein the controller displays at least one operation menu area on the touch screen, each of the at least one operation menu area having a corresponding operation and performs the corresponding operation if a touch input is received in the at least one operation menu area.

26. The mobile communication terminal of claim 25, wherein performing the corresponding operation comprises storing the digit string entered at the first area in a memory.

27. The mobile communication terminal of claim 18, wherein the controller displays a list comprising information corresponding to at least a most-frequent phone number or a recent phone number on the touch screen if the digit string is not displayed on the second area when a touch input is received on the second area.

28. The mobile communication terminal of claim 27, wherein the controller displays a communication menu when a touch input is received on the area of the list on which information related to a specific phone number is displayed.

29. The mobile communication terminal of claim 28, wherein
the communication menu comprises at least a first area, a second area, or a third area, and
the controller performs a call to the specific phone number when a touch input is received on the first area, performs a function for sending a text message when a touch input is received on the second area and displays a previous list when a touch input is received on the third area.

30. The mobile communication terminal of claim 18, wherein the controller displays a list comprising information corresponding to at least a most-frequent phone number or a recent phone number on the touch screen if the digit string displayed on the second area does not match at least one phone number stored in the mobile communication terminal when a touch input is received on the second area.

31. The mobile communication terminal of claim 30, wherein the controller displays a communication menu when a touch input is received on the area of the list on which information related to a specific phone number is displayed.

32. The mobile communication terminal of claim 31, wherein
the communication menu comprises at least a first area, a second area, or a third area, and
the controller performs a call to the specific phone number when a touch input is received on the first area, performs a function for sending a text message when a touch input is received on the second area and displays a previous list when a touch input is received on the third area.

33. The mobile communication terminal of claim 18.

34. The mobile communication terminal of claim 33, wherein
the communication menu comprises at least a first area, a second area, or a third area, and
the controller performs a call to the specific phone number when a touch input is received on the first area, performs a function for sending a text message when a touch input is received on the second area and displays a previous list when a touch input is received on the third area.

* * * * *